(12) United States Patent
Imayoshi

(10) Patent No.: US 12,086,493 B2
(45) Date of Patent: Sep. 10, 2024

(54) IMAGE FORMING SYSTEM TO WHICH MULTIPLE IMAGE FORMING DEVICES THAT OUTPUT IMAGE DATA ARE CONNECTED VIA A NETWORK

(71) Applicant: SHARP KABUSHIKI KAISHA, Sakai (JP)

(72) Inventor: Kenichiroh Imayoshi, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 18/227,271

(22) Filed: Jul. 27, 2023

(65) Prior Publication Data

US 2024/0045634 A1 Feb. 8, 2024

(30) Foreign Application Priority Data

Aug. 5, 2022 (JP) ................................ 2022-125399

(51) Int. Cl.
 *G06F 3/12* (2006.01)
 *H04N 1/34* (2006.01)

(52) U.S. Cl.
CPC ............ *G06F 3/129* (2013.01); *G06F 3/1203* (2013.01); *G06F 3/1236* (2013.01); *G06F 3/126* (2013.01); *G06F 3/1291* (2013.01); *G06F 3/1292* (2013.01); *H04N 1/34* (2013.01)

(58) Field of Classification Search
CPC ...... G06F 3/1203; G06F 3/1236; G06F 3/126; G06F 3/129; G06F 3/1291; G06F 3/1292; H04N 1/00209; H04N 1/00244; H04N 1/00307; H04N 1/32523; H04N 1/32529; H04N 1/32534; H04N 1/32539; H04N 1/34–348

See application file for complete search history.

(56) References Cited

U.S. PATENT DOCUMENTS

| | | | | |
|---|---|---|---|---|
| 9,081,521 B2 * | 7/2015 | Murthy | .................. | G06Q 30/06 |
| 9,081,527 B2 * | 7/2015 | Nuggehalli | .......... | G06K 15/402 |
| 10,404,889 B2 * | 9/2019 | Miyamoto | ......... | H04N 1/00204 |
| 10,503,451 B2 * | 12/2019 | Yamada | ................ | G06F 3/1292 |
| 10,931,833 B2 * | 2/2021 | Saeda | ................... | G06F 3/1286 |
| 11,467,782 B2 * | 10/2022 | Saeda | ................... | G06F 3/1238 |

(Continued)

FOREIGN PATENT DOCUMENTS

JP 2003-099229 A 4/2003

*Primary Examiner* — Scott A Rogers
(74) *Attorney, Agent, or Firm* — ScienBiziP, P.C.

(57) ABSTRACT

An image forming system in which a plurality of image forming devices that each output image data are connected via a network includes an operation acceptor that accepts an operation, a network communicator that performs communication via the network, a terminal communicator that communicates with a mobile terminal, an information acquirer that acquires, as connection information, a communication status between the mobile terminal and the plurality of image forming devices, and an output-destination specifier that specifies an output destination of the image data on the basis of the connection information. The output-destination specifier specifies, as the output destination of the image data, of the plurality of image forming devices communicating with the mobile terminal, an image forming device accepted by the operation acceptor.

8 Claims, 6 Drawing Sheets

(56) References Cited

U.S. PATENT DOCUMENTS

| | | | |
|---|---|---|---|
| 11,829,672 B2 * | 11/2023 | Suzuki | G06F 3/1203 |
| 11,829,675 B2 * | 11/2023 | Yu | G06F 3/1232 |
| 2014/0368882 A1 * | 12/2014 | Park | G06F 3/1204 |
| | | | 358/1.15 |
| 2023/0063963 A1 * | 3/2023 | Suzuki | G06F 3/1292 |
| 2023/0291847 A1 * | 9/2023 | Imayoshi | H04N 1/00896 |

* cited by examiner

IMAGE FORMING SYSTEM TO WHICH MULTIPLE IMAGE FORMING DEVICES THAT OUTPUT IMAGE DATA ARE CONNECTED VIA A NETWORK

TECHNICAL FIELD

The disclosure relates to an image forming system in which a plurality of image forming devices that each output image data are connected via a network.

BACKGROUND ART

Nowadays, image forming devices are installed in various places such as outlets like convenience stores and public facilities, and have become widely prevalent. To improve convenience, there is a demand for providing a user with a copy output even when a user does not have an original copy at hand, and a remote printing system has been proposed for this purpose. It is known in the related art that in a remote printing system, print data is sent to an image forming device located at a remote location via a network to perform printing.

SUMMARY

Technical Problem

In the known remote printing system, a document server and an image forming device are connected to each other via a network, the remote printing system includes a mobile terminal capable of sending, to the document server, an email address indicating an image forming device to be a print-destination and selection information of a print document in the document server, and the document server sends data of the document specified in the selection information to the email address received from the mobile terminal.

In the known remote printing system, the document server and the image forming device communicate, the data of the document is stored in the document server in advance, and it is not assumed that multiple image forming devices communicate with each other. That is, no consideration is given to usage in which printed matter is output via image forming devices nearest to respective users in the case of, for example, sending printed matter such as a photograph or a document to users such as a family at a remote place.

The disclosure has been made to solve the above problems, and an object of the disclosure is to provide an image forming system capable of narrowing down image forming devices to be specified as an output destination according to communication status with a mobile terminal.

Solution to Problem

An image forming system according to the disclosure is an image forming system including a plurality of image forming devices that each output image data, and the plurality of image forming devices are connected via a network. The image forming system includes an operation acceptor that accepts an operation, a network communicator that performs communication via the network, a terminal communicator that communicates with a mobile terminal, an information acquirer that acquires, as connection information, a communication status between the mobile terminal and the plurality of image forming devices, and an output-destination specifier that specifies an output destination of image data on the basis of the connection information. In the image forming system, the output-destination specifier specifies, as the output destination of the image data, of the plurality of image forming devices communicating with the mobile terminal, an image forming device accepted by the operation acceptor.

The image forming system according to the disclosure may include a collator that collates address information acquired from the mobile terminal with the connection information, and the output-destination specifier may extract, of the plurality of image forming devices, an image forming device to be specified as the output destination, on the basis of a collation result of the collator.

In the image forming system according to the disclosure, each of the plurality of image forming devices may include an inputter that accepts an input of the image data and an outputter that outputs the image data, and the operation acceptor may accept an operation to set an image forming device of the plurality of image forming devices serving as an input source of the image data and an image forming device of the plurality of image forming devices serving as the output destination of the image data to be different from each other.

In the image forming system according to the disclosure, each of the plurality of image forming devices may stop processing when communication between the mobile terminal and the terminal communicator is disconnected.

The image forming system according to the disclosure may include a storage that stores output information related to output of the image data, and each of the plurality of image forming devices may read out the output information and output the image data.

In the image forming system according to the disclosure, a charge for output of the image data may be set in advance, and the operation acceptor may accept specification of an image forming device, of the plurality of image forming devices, serving as a payment device.

In the image forming system according to the disclosure, the operation acceptor may accept an operation of specifying two or more image forming devices of the plurality of image forming devices, as output destinations of the image data.

In the image forming system according to the disclosure, the operation acceptor may accept an instruction for a preliminary output, and, when the preliminary output is instructed, each of the plurality of image forming devices may output image data regardless of whether the image forming device is specified as the output destination.

The image forming system according to the disclosure may include a server connected to the network.

Advantage Effects of Disclosure

According to the disclosure, it is possible to narrow down the image forming devices to be specified as an output destination of image data according to communication status with a mobile terminal, and to enable a user to select an image forming device to output image data.

DESCRIPTION OF EMBODIMENTS

An image forming system according to an embodiment of the disclosure will be described below with reference to the accompanying drawings.

Figure 1:
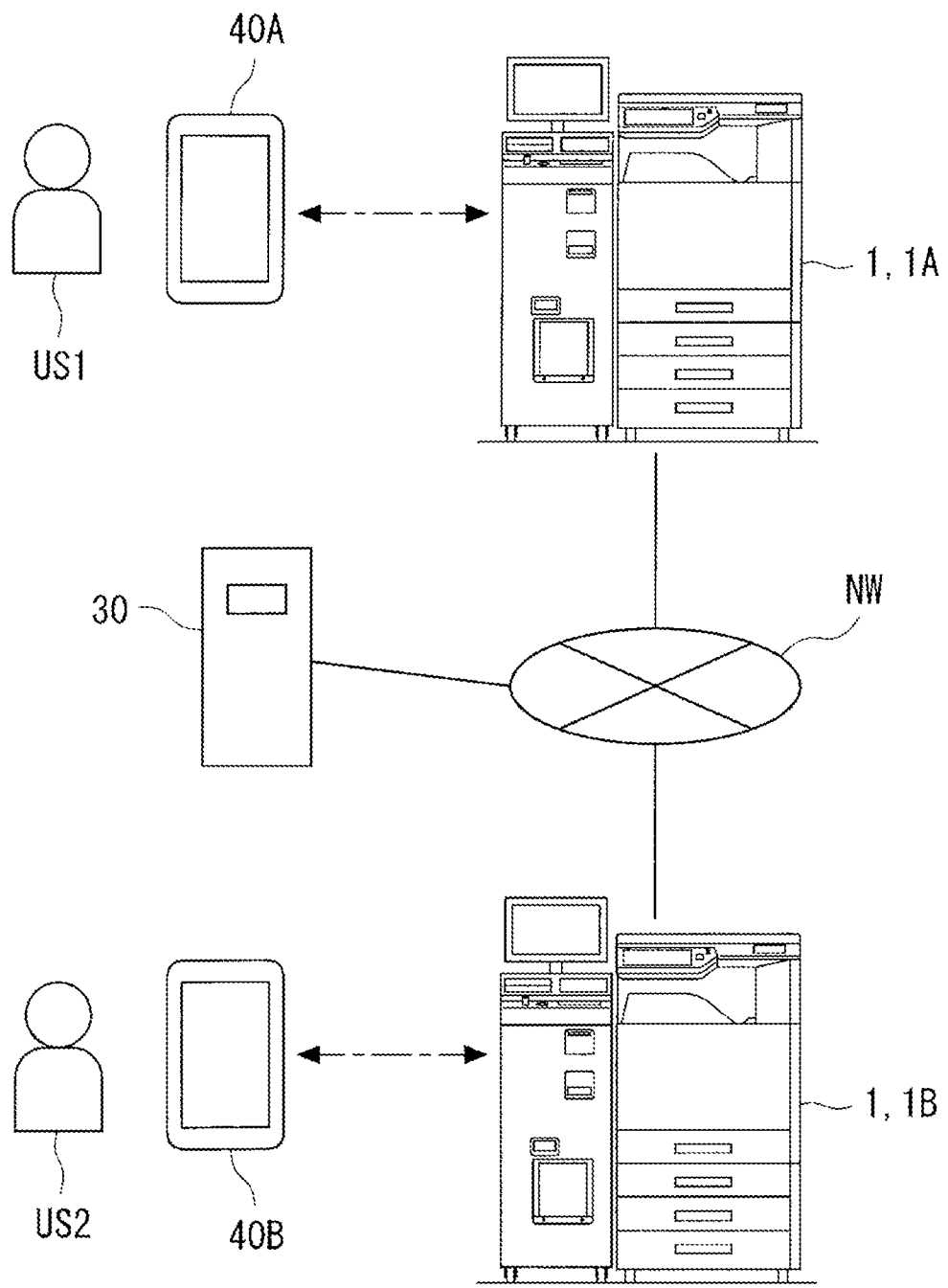
FIG. 1 is a system configuration diagram illustrating an image forming system according to an embodiment of the disclosure.

FIG. 1 is a system configuration diagram illustrating an image forming system according to an embodiment of the disclosure.

In the image forming system, a plurality of image forming devices 1 and a server 30 communicate with each other via a network NW. The image forming device 1 communicates with mobile terminals (input-source terminal 40A and output-destination terminal 40B) via short-range wireless communication. The mobile terminal is, for example, a mobile phone terminal, a tablet, or a personal computer.

In the image forming system, the image forming device 1 specified as the input source accepts an input of image data (an image), and the image forming device 1 specified as the output destination outputs the image data. In the following description, to distinguish between the plurality of mobile terminals, a mobile terminal used (owned) by an input-source user US1 may be referred to as the input-source terminal 40A, and a mobile terminal used (owned) by an output-destination user US2 may be referred to as the output-destination terminal 40B. Among the plurality of image forming devices 1, the image forming device 1 located near the input-source user US1 (input-source terminal 40A) may be referred to as an input-source image forming device 1A, and the image forming device 1 located near the output-destination user US2 (output-destination terminal 40B) may be referred to as an output-destination image forming device 1B. Further, the input-source user US1, the input-source terminal 40A, and the input-source image forming device 1A may be collectively referred to simply as an input source, and the output-destination user US2, the output-destination terminal 40B, and the output-destination image forming device 1B may be collectively referred to simply as an output destination.

In the image forming system, various kinds of information may be individually managed by the image forming device 1, or various kinds of information may be sent to the server 30 and collectively managed by the server 30, and the image forming device 1 may hold the minimum amount of information necessary.

Figure 2:
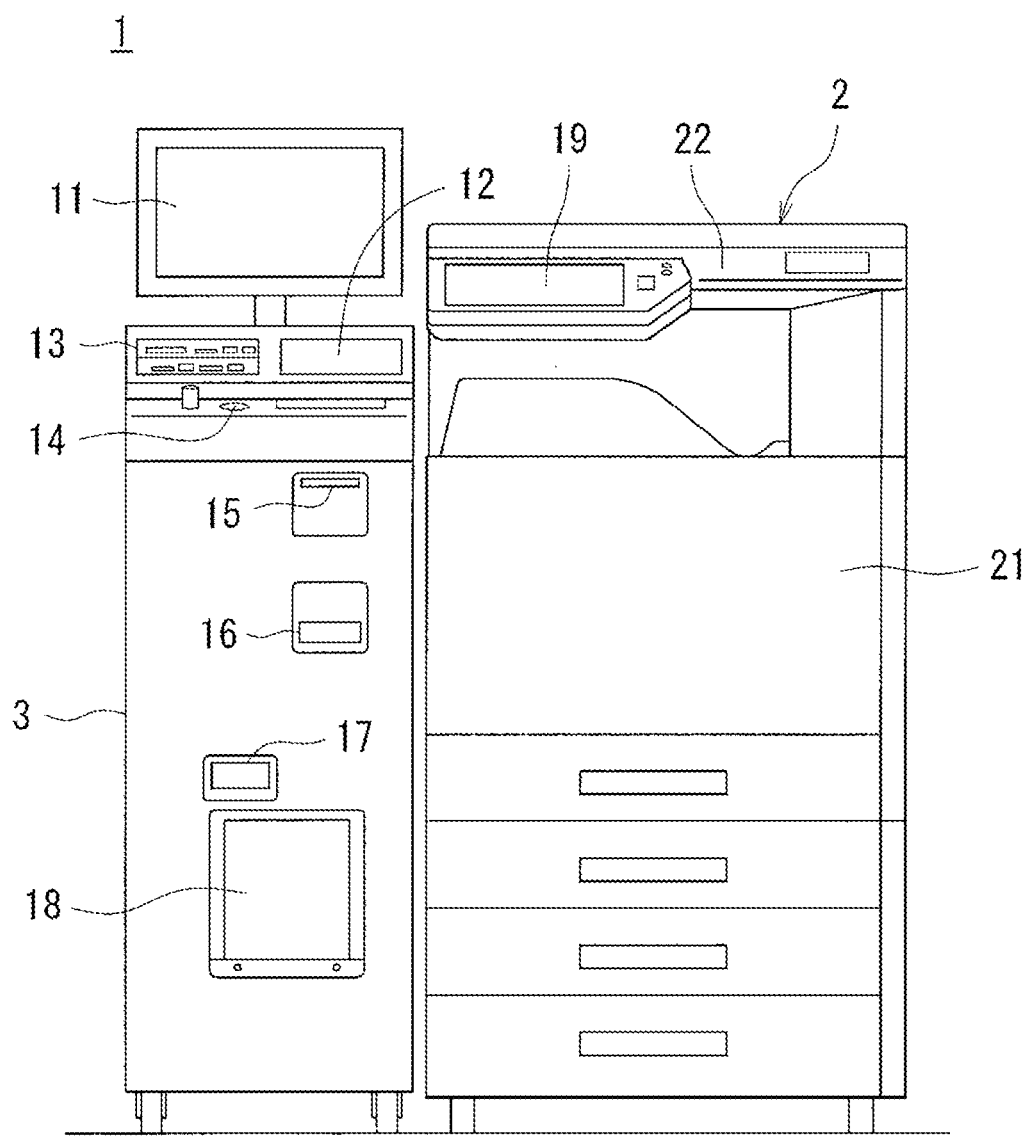
FIG. 2 is an external front view illustrating the image forming device.

FIG. 2 is an external front view illustrating the image forming device.

The image forming device 1 includes a multifunction peripheral 2 having a scanner function, a copy function, an image printing function, a facsimile function, and the like, and a money-receiving terminal 3 that accepts payment of cash or the like. The multifunction peripheral 2 and the money-receiving terminal 3 are connected to each other, and transmit data between each other to perform a cooperative operation. A display panel 11 is attached to the upper side of the money-receiving terminal 3. The display panel 11 is a touch panel display. Note that the display panel 11 is not limited to a touch panel display and may be a simple display, and a button or the like that accepts an input may be separately provided.

The money-receiving terminal 3 includes a terminal communicator 12, a medium connection unit 13, a coin insertion slot 14, a receipt ejection port 15, a bill insertion slot 16, a coin return tray 17, and a sheet ejection port 18. The medium connection unit 13 includes an insertion slot for a recording medium such as a memory card and a connector that connects a cable or the like. The terminal communicator 12 communicates with an information holding medium such as an IC card or a mobile terminal, and receives address information of the mobile terminal, electronic money information related to electronic money payment and the like from the information holding medium. The coin insertion slot 14 and the bill insertion slot 16 correspond to a money receiver that accepts payment, and accept the insertion of coins and bills. Hereinafter, to facilitate the description, the coin insertion slot 14 and the bill insertion slot 16 may be collectively referred to as a money receiver. In the coin return tray 17, coins to be returned are ejected corresponding to change or the like.

The money-receiving terminal 3 internally includes a receipt printing unit that prints on a sheet such as a sheet of thermal paper, and ejects a receipt printed by the receipt printing unit from the receipt ejection port 15. The money-receiving terminal 3 internally includes an image printing unit that prints an image on a sheet, and ejects the sheet printed by the image printing unit from the sheet ejection port 18.

The multifunction peripheral 2 is provided with an operation panel 19 having substantially the same function as the display panel 11. The multifunction peripheral 2 includes a printing unit 21 (an example of an outputter) that forms an image corresponding to image data on a sheet, and a scanner 22 (an example of an inputter) that scans a placed document and creates image data, and the sheet formed by the printing unit 21 is ejected to an ejection tray provided in a body of the multifunction peripheral 2.

In the image forming device 1, one of the printing unit 21 of the multifunction peripheral 2 and the receipt printing unit and image printing unit of the money-receiving terminal 3 may be selected to perform printing on the sheet in accordance with output conditions such as the size and color of the sheet in image formation.

Figure 3:
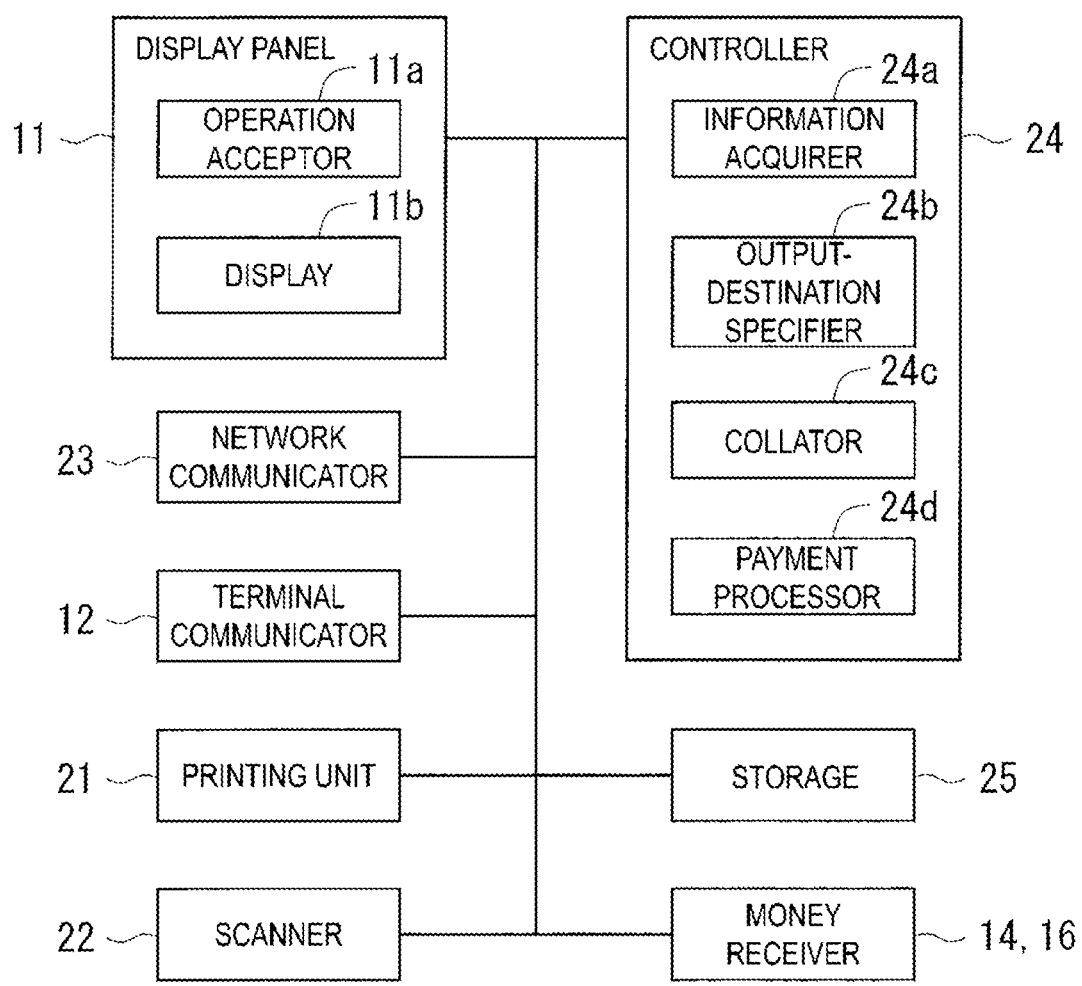
FIG. 3 is a schematic configuration diagram illustrating a schematic configuration of the image forming device.

FIG. 3 is a schematic configuration diagram illustrating a schematic configuration of the image forming device.

The image forming device 1 includes a network communicator 23, a controller 24, and a storage 25 in addition to the display panel 11, the terminal communicator 12, the money receiver, the printing unit 21, and the scanner 22 described above. The network communicator 23 communicates with another image forming device 1 and the server 30 via the network NW. The storage 25 is a storage medium such as a memory or an HDD and stores various types of information.

The display panel 11 functions as both an operation acceptor 11a that accepts an operation by a user and a display 11b that displays a screen. Note that, without being limited to this configuration, the operation acceptor 11a and the display 11b may also be provided separately in the image forming device 1.

The controller 24 is a CPU provided in the image forming device 1. The controller 24 controls various operations of the image forming device 1, and includes an information acquirer 24a, an output-destination specifier 24b, a collator 24c, and a payment processor 24d.

The information acquirer 24a acquires a communication status between the mobile terminal and the image forming device 1 as connection information. The image forming device 1 communicates with the mobile terminal via short-range wireless communication by using the terminal communicator 12. A state in which the image forming device 1 is communicably connected to the mobile terminal is hereinafter referred to as pairing.

The output-destination specifier 24b specifies an output destination of the image data based on the connection information. The collator 24c collates the address information acquired from the mobile terminal with the connection information. The payment processor 24d performs various kinds of processing related to the payment of charges for outputting image data, which are set in advance. The output-destination specifier 24b, the collator 24c, and the payment processor 24d will be described together with the processing flow of the image forming device 1 with reference to FIG. 6 to be described later.

Figure 4:
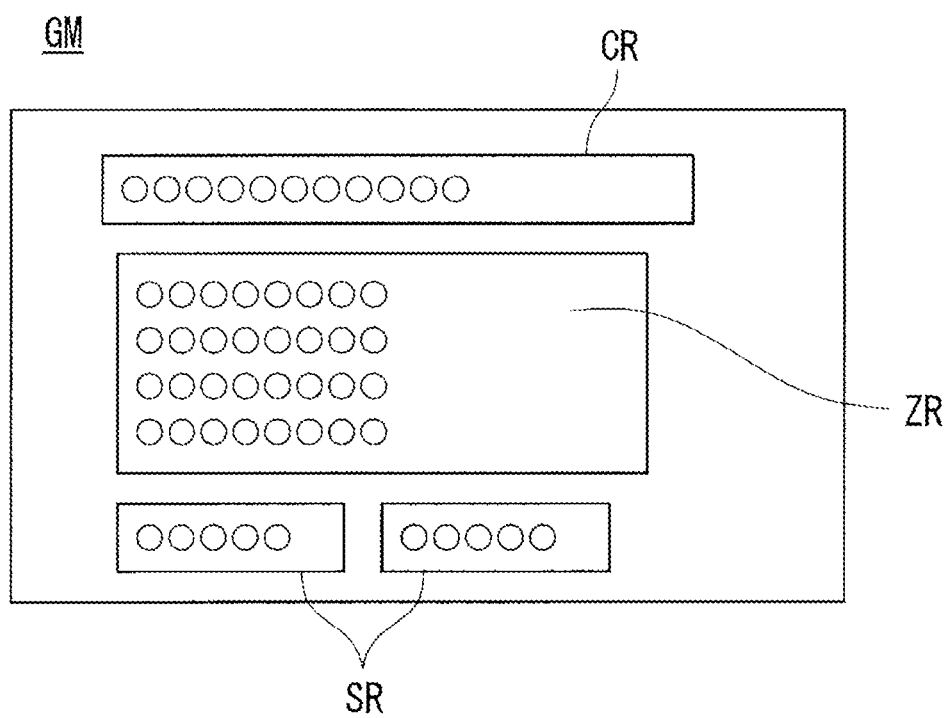
FIG. 4 is an explanatory diagram illustrating a display screen displayed on a display.

FIG. 4 is an explanatory diagram illustrating a display screen displayed on a display.

A display screen GM includes a comment region CR, an information region ZR, and an operation acceptance region SR. The comment region CR is a region that displays an instruction to the user. For example, text such as "Select your role" or "Please wait" is displayed. The information region ZR is a region that notifies the user of information. For example, content related to an output destination of image data and various conditions in image formation is displayed. The operation acceptance region SR is a region that displays buttons that accept user operations. For example, a button used to select an output destination of image data or a button used to select an answer to a question are displayed. Note that the content displayed in the comment region CR, the information region ZR, and the operation acceptance region SR is changed as needed in accordance with the processing flow of the image forming device 1, and the content will be described together with the processing flow illustrated in FIG. 5 to be described later.

On the display screen GM, all of the comment region CR, the information region ZR, and the operation acceptance region SR need not always be displayed during the processing flow. Therefore, necessary items may be appropriately displayed as required, and the size and arrangement of the items may be changed.

Figure 5:
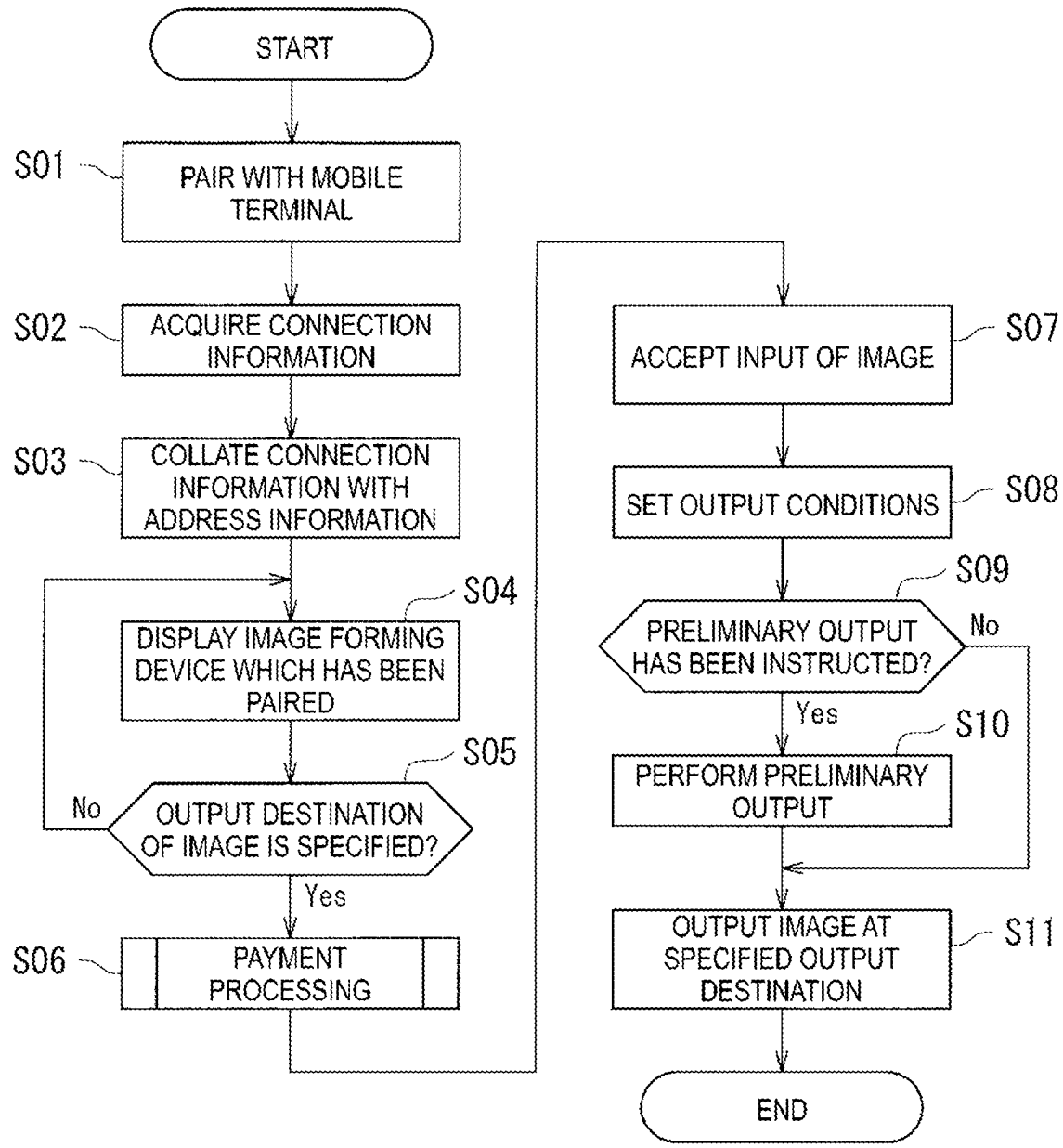
FIG. 5 is a flowchart illustrating a processing flow when an image is printed in an image forming system according to an embodiment of the disclosure.

FIG. 5 is a flowchart illustrating a processing flow when an image is printed in an image forming system according to an embodiment of the disclosure.

The image forming device 1 may perform not only remote copying in which copying (image formation) is performed in cooperation with another image forming device 1 via the network NW, but also normal copying in which the image forming device 1 operates alone. A start time in the processing flow illustrated in FIG. 5 is when an instruction to perform remote copying is given.

Prior to the start time of the processing flow, "Select a job" is displayed in the comment region CR of the display screen GM, and which of the normal copying and the remote copying is selected by the user is accepted in the operation acceptance region SR. If remote copying is selected, the display screen GM is changed to display "Select your role" in the comment region CR, and which of the input source and the output destination of the image data is selected by the user is accepted in the operation acceptance region SR. After the input source and the output destination of the image data are determined, the display screen GM is changed again to display "Who will perform the operation?" in the comment region CR, and the selection of whether the user him/herself or another user mainly performs the operation is accepted in the operation acceptance region SR.

In step S01, the terminal communicator 12 performs pairing with the mobile terminal. Here, on the display screen GM, "Pair the portable terminal" is displayed in the comment region CR, and the mobile terminal and the image forming device 1 are in the standby state until the mobile terminal and the image forming device 1 enter a communicable state via the terminal communicator 12.

In step S02, the information acquirer 24a acquires the connection information. The connection information indicates whether the mobile terminal is in a communicable state with the image forming device 1. By referring to the connection information, it is possible to identify the mobile terminal that has been paired with the image forming device 1. The acquired connection information may be sent to the image forming device 1 that has been paired with the mobile terminal, or may be sent to the server 30 and then sent from the server 30 to the corresponding image forming device 1. Specifically, as for the acquired connection information, for example, in the case of the input-source image forming device 1A illustrated in FIG. 1, not only the connection information between the input-source image forming device 1A and the input-source terminal 40A but also the connection information between the output-destination image forming device 1B and the output-destination terminal 40B received via the network NW is acquired.

When pairing is achieved with the mobile terminal, address information of the mobile terminal is acquired together with the connection information. The address information is, for example, an address book or a telephone book including an address, a name, a telephone number, and an email address. The collator 24c can identify a mobile terminal registered in the address book or the telephone book by referring to the address information.

In step S03, the collator 24c collates the connection information with the address information. Here, whether the mobile terminal identified by the connection information corresponds to the address information is output as a collation result.

In step S04, the display 11b displays the image forming device 1 that has been paired. Here, all the image forming devices 1 that have been paired with any one of the mobile terminals may be displayed. Further, on the basis of the collation result of the collator 24c, the corresponding image forming device 1 may be extracted and displayed. Using FIG. 1 as an example, when the output-destination terminal 40B corresponds to the address information acquired from the input-source terminal 40A and the output-destination image forming device 1B and the output-destination terminal 40B have been paired, information about the output-destination image forming device 1B and the output-destination terminal 40B is displayed in the information region ZR of the display screen GM.

In step S05, the output-destination specifier 24b judges whether the output destination of the image (image data) is specified. If only one image forming device 1 is displayed in step S04, the output-destination image forming device 1 may be specified without confirming with the user, or the output-destination image forming device 1 may be specified after confirming with the user. If there are a plurality of corresponding image forming devices 1, all of the corresponding image forming devices 1 may be displayed. When a plurality of image forming devices 1 are displayed, the user may be allowed to select the image forming device 1 to be specified as the output destination. As a result, in a case in which the output destination of the image is specified (step S05: Yes), the processing proceeds to step S06. On the other hand, in a case in which the output destination of the image is not specified (step S05: No), the processing returns to step S04, and the screen that allows the user to specify the output destination may be continuously displayed.

In step S06, the payment processor 24d performs payment processing. The payment processing will be described with reference to FIG. 6 to be described later.

In step S07, the scanner 22 accepts input of an image. Here, on the display screen GM of the input source, a notification prompting input of an image may be displayed in the comment region CR, and on the display screen GM of the output destination, a notification indicating that input of an image is awaited may be displayed in the comment region CR.

In step S08, the controller 24 sets output conditions. Here, the display screen GM displays the set output conditions, and the output conditions may be changed as required according to the operation of the user.

In step S09, the controller 24 judges whether a preliminary output has been instructed. In a case in which a preliminary output has been instructed (step S09: Yes), the processing proceeds to step S10. On the other hand, in a case in which a preliminary output has not been instructed (step S09: No), the processing proceeds to step S11.

In step S10, the printing unit 21 performs a preliminary output. In the image forming device 1, a preliminary output for output of the image data is accepted regardless of whether the image forming device 1 is specified as the output destination. That is, when the input-source user US1 instructs execution of the preliminary output, the image is printed at the input-source image forming device 1A on the basis of the set output conditions. After the image is printed, the user may be asked whether to change the output conditions, and if the user issues an instruction to change the output conditions, the processing returns to step S08 and is repeated.

In this way, by performing the preliminary output, the user can understand how the image data will be output, and it is possible to prevent the image data from being output in a state not intended by the user.

In step S11, the image is output at the specified output destination, and the processing is terminated. That is, the image is printed by the printing unit 21 of the output-destination image forming device 1B.

In the above-described image forming system, the scanner 22 scans an image on a sheet and the printing unit 21 prints the image on a sheet, but the image forming system is not limited to this configuration and may handle the image data itself. That is, the input-source image forming device 1A may accept input of image data from an information holding medium such as the input-source terminal 40A, and the output-destination image forming device 1B may output the image data to an information holding medium such as the output-destination terminal 40B.

Figure 6:
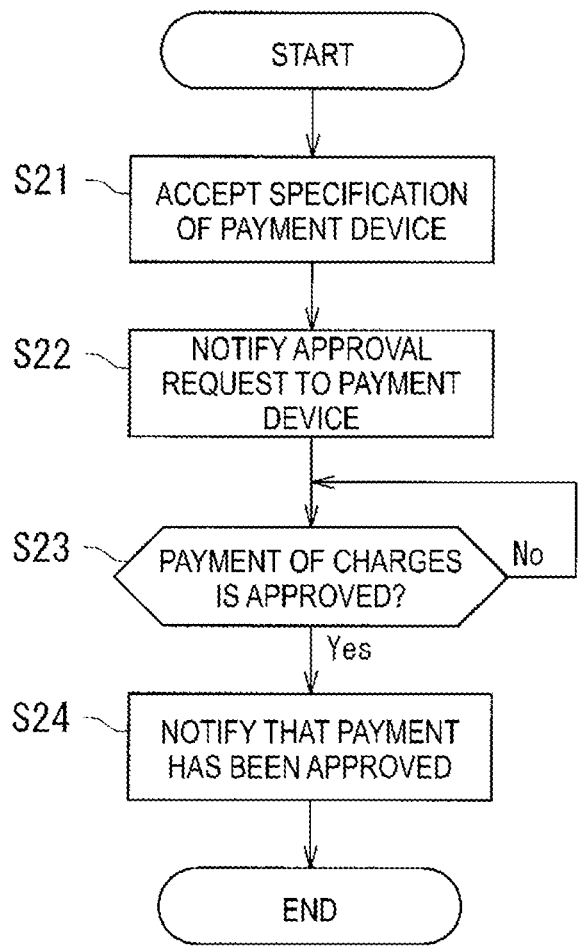
FIG. 6 is a flowchart illustrating a processing flow of payment processing.

FIG. 6 is a flowchart illustrating a processing flow of the payment processing.

In step 521, the operation acceptor 11a accepts specification of the payment device. Here, on the display screen GM, "Who bears the charges?" is displayed in the comment region CR, and the selection of whether the charges are borne by the user him/herself or another user may be accepted in the operation acceptance region SR.

In step S22, the display 11b notifies the payment device of an approval request. Here, on the display screen GM of the image forming device 1 specified as the payment device, "Please approve the cost bearing request" is displayed in the comment region CR, and selection of whether to comply with the cost bearing request (approval request for payment of charges) may be accepted in the operation acceptance region SR.

In step S23, the payment processor 24d judges whether the payment of charges has been approved. Here, if a user performs an operation to select to comply with the cost bearing request, it is judged that the payment of charges is approved. In a case in which the payment of the charges is approved (step S23: Yes), the processing proceeds to step S24. On the other hand, in a case in which the payment of the charges is not approved (step S23: No), the processing is in the standby state until the payment is approved.

In step S24, the display 11b issues a notification that the payment has been approved. On the display screen GM of the image forming device 1 other than the payment device, the user is notified that the image forming device 1 is on standby until the payment is approved at the payment device, and if the payment is approved at the payment device, the user is notified that the payment of charges has been approved. After the payment of charges is approved, the processing proceeds to step S07 in FIG. 5.

Thus, by performing the payment processing, the user can select the payment device with which to pay the charges for outputting the image data.

As described above, in the image forming system, the output-destination specifier 24b specifies, as the output destination of the image data, the image forming device 1 accepted by the operation acceptor 11a, from among the plurality of image forming devices 1 communicating with the mobile terminal. Thus, it is possible to narrow down the image forming devices 1 to be specified as output destinations of image data according to the communication status with the mobile terminal, and to allow the user to select the image forming device 1 to output the image data.

Since the image forming device 1 to be specified as the output destination is extracted on the basis of the address information, it is possible to omit the image forming device 1 communicating with a third party not related to the user, and to allow the user to select the appropriate image forming device 1.

Further, the operation acceptor 11a accepts an operation to set an image forming device 1 serving as an input source of image data and an image forming device 1 serving as an output destination of the image data to be different from each other. Thus, by setting the input source and the output destination to be different from each other, for example, it is possible to perform remote copying in which image data is input from a nearby image forming device 1 and is output from a remote image forming device 1.

The image forming device 1 stops processing when communication between the mobile terminal and the terminal communicator 12 is disconnected. In addition, updated connection information may be sent to an image forming device 1 cooperating with the image forming device 1 at which communication between the mobile terminal and the terminal communicator 12 has been disconnected, to notify that communication with the mobile terminal has been disconnected, and the processing may be stopped in conjunction with the disconnected communication. As a result of such an operation, it is possible to prevent image data from being output from the image forming device 1 for which the user is away and absent.

The storage 25 may store output information related to the output of the image data, and the image forming device 1 may read out the output information and output the image data. That is, since the output information is stored in the storage 25, it is possible to re-output the image data by reading out the output information at an arbitrary timing in response to an instruction by the user.

The operation acceptor 11a may accept an operation of specifying a plurality of image forming devices 1 as output destinations of the image data. That is, on the display screen GM corresponding to step S05 in FIG. 5, a plurality of image forming devices 1 may be specified as output destinations, and the image data may be output at all the image forming devices 1 specified as output destinations. As a result, it is possible to cause a plurality of image forming devices 1 to output image data by a single operation. Thus, it is possible to improve convenience for the user.

Note that the embodiments disclosed herein are illustrative in all respects and are not the basis for a limited interpretation. Accordingly, the technical scope of the disclosure is not to be construed by the foregoing embodiments only, and is defined based on the description of the claims. In addition, meanings equivalent to the range of the claims and all changes made within the range are included.

Further, the functions described in each embodiment are described as being executed by each of the devices, but these functions may be realized by one device, or realized by further using an external server.

Additionally, each functional block or characteristic of the devices used in the embodiments described above may be implemented or executed by an electrical circuit, for example, an integrated circuit or a plurality of integrated circuits. An electrical circuit designed to execute the functions described herein may include a general-purpose processor, a digital signal processor (DSP), an application-specific integrated circuit (ASIC), a field-programmable gate array (FPGA), or another programmable logic device, discrete gate or transistor logic, discrete hardware component, or a combination of any of these. The general-purpose processor may be a microprocessor, a known processor, a controller, a microcontroller, or a state machine. The electrical circuit described above may be a configured by a digital circuit or an analog circuit. Further, should advancements in semiconductor technology result in the development of integrated circuit technology that replaces an existing integrated circuit, one or more aspects of the disclosure can also use a new integrated circuit using this technology.

REFERENCE SIGNS LIST

1 Image forming device
1A Input-source image forming device
1B Output-destination image forming device
11 Display panel
11a Operation acceptor
11b Display
12 Terminal communicator
21 Printing unit (example of outputter)
22 Scanner (example of inputter)
23 Network communicator
24 Controller
24a Information acquirer
24b Output-destination specifier
24c Collator
24d Payment processor
25 Storage
30 Server
40A Input-source terminal (example of mobile terminal)
40B Output-destination terminal (example of mobile terminal)
NW Network
US1 Input-source user
US2 Output-destination user

The invention claimed is:

1. An image forming system including a plurality of image forming devices each of which outputs image data, the plurality of image forming devices being connected via a network, the image forming system comprising:
   an operation acceptor that accepts an operation;
   a network communicator that performs communication via the network;
   a terminal communicator that communicates with a mobile terminal;
   an information acquirer that acquires, as connection information, a communication status between the mobile terminal and the plurality of image forming devices;
   an output-destination specifier that specifies an output destination of the image data based on the connection information; and
   a collator that collates address information acquired from the mobile terminal with the connection information,
   wherein the collator outputs, as a collation result, information corresponding to the image forming device that communicates with the mobile terminal and that is registered in the address information, and
   the output-destination specifier extracts, from the plurality of image forming devices communicating with the mobile terminal, a first image forming device to be specified as the output destination of the image data based on the collation result of the collator, and specifies, as the output destination of the image data, from the plurality of image forming devices communicating with the mobile terminal, a second image forming device accepted by the operation acceptor.

2. The image forming system according to claim 1, wherein each of the plurality of image forming devices includes an inputter that accepts an input of the image data and an outputter that outputs the image data, and
   the operation acceptor accepts the operation to set the second image forming device of the plurality of image forming devices serving as an input source of the image data and the first image forming device of the plurality of image forming devices serving as the output destination of the image data to be different from each other.

3. The image forming system according to claim 1, wherein each of the plurality of image forming devices stops processing when communication between the mobile terminal and the terminal communicator is disconnected.

4. The image forming system according to claim 1, further comprising:
   a storage that stores output information related to the output of the image data,
   wherein each of the plurality of image forming devices reads out the output information and outputs the image data.

5. The image forming system according to claim 1, wherein a charge for the output of the image data is set in advance, and
   the operation acceptor further accepts a specification of a third image forming device, of the plurality of image forming devices, serving as a payment device.

6. The image forming system according to claim 1, wherein the operation acceptor accepts the operation of specifying two or more image forming devices of the plurality of image forming devices, as output destinations of the image data.

7. The image forming system according to claim 1,
wherein the operation acceptor further accepts an instruction for a preliminary output, and
when the preliminary output is instructed, each of the plurality of image forming devices outputs the image data regardless of whether the first image forming device is specified as the output destination.

8. The image forming system according to claim 1, further comprising:
a server connected to the network.

* * * * *